United States Patent [19]

Steigerwald

[11] Patent Number: 4,758,940
[45] Date of Patent: Jul. 19, 1988

[54] CONTROL CIRCUIT FOR INSURING SUPER-RESONANT OPERATION OF RESONANT CONVERTER

[75] Inventor: Robert L. Steigerwald, Burnt Hills, N.Y.

[73] Assignee: General Electric Company, Schenectady, N.Y.

[21] Appl. No.: 45,655

[22] Filed: May 4, 1987

[51] Int. Cl.$^4$ ............................................. H02M 3/24
[52] U.S. Cl. .................................... 363/98; 363/17
[58] Field of Search .................... 363/16, 17, 98, 132

[56] References Cited

U.S. PATENT DOCUMENTS

| 4,541,041 | 9/1985 | Park et al. | 363/132 X |
|---|---|---|---|
| 4,591,963 | 5/1986 | Retotar | 363/98 X |
| 4,691,273 | 9/1987 | Kuwata et al. | 363/98 X |
| 4,695,934 | 9/1987 | Steigerwald et al. | 363/98 X |

Primary Examiner—Patrick R. Salce
Assistant Examiner—Marc S. Hoff
Attorney, Agent, or Firm—Geoffrey H. Krauss; James C. Davis, Jr.; Marvin Snyder

[57] ABSTRACT

A control circuit for insuring super-resonant operation of a DC-to-AC resonant converter, having a resonance circuit with a resonant frequency $F_r$, in which a circulating current $i_r$ flows between a first node A, alternatingly connected between an input potential and a primary common potential at an operating frequency F, and a second node B, includes: a subcircuit for generating a first signal representative of the phase of the circulating current $i_r$; another subcircuit for generating a second signal representative of the phase of a potential $V_{AB}$ between the first and second nodes; and a comparator which compares the first and second signals to increase the operating frequency F if the phase of the circulating current $i_r$ leads the phase of the node-to-node potential $V_{AB}$. The reasonance circuit can be a series, parallel or series-parallel resonant arrangement, typically driven by a pair of alternatingly-conductive semiconductor switching devices, themselves driven by a voltage-controlled oscillator (VCO). In one embodiment, the VCO frequency is increased whenever a current zero crossing occurs before the end of a VCO waveform half-cycle.

23 Claims, 3 Drawing Sheets

CONTROL CIRCUIT FOR INSURING SUPER-RESONANT OPERATION OF RESONANT CONVERTER

The present application relates to power supplies and, more particularly, to a novel circuit for controlling a resonant power converter to always operate in the super-resonant mode.

It is known that a half-bridge resonant converter power supply can operate as a series resonant, parallel resonant or combination series-parallel resonant circuit on the primary side of the converter power transformer. While it is highly advantageous to utilize the series resonant configuration so that the primary side series resonance capacitors act as DC blocking capacitors, the converter output voltage cannot be regulated for the no-load situation, and the output DC filter capacitor must carry a relatively high ripple current. The parallel resonant converter is not only naturally short-circuit-proof, but is also able to control the no-load output voltage by operating at a frequency above the resonance frequency, although the circulating current in the power switching devices and resonant circuit components stays at a relatively constant value, independent of load, so that efficiency falls with a large input voltage range and with variable load. The combination series-parallel resonant converter attempts to take advantage of the best characteristics of both the series resonant converter and the parallel resonant converter, while eliminating the respective weak points of these circuits (lack of no-load regulation for the series resonant circuit and circulating current independent of load for the parallel resonant circuit). It is known to design a series-parallel resonant converter to have a parallel resonant capacitance $C_P$ which is on the order of the series-resonant capacitance $C_S$, so that no-load converter operation is possible along with the desirable decrease of circulating current for a decrease in load current (i.e. for a load resistance increase). It also is desirable to decrease the circulating current with a decrease in load, in order to maintain high part-load efficiency.

Conventionally, the output voltage of a resonant converter is controlled by varying the operating frequency to be in a range above the resonant frequency, and by placing a lower limit on operating frequency to assure that operation below the resonant frequency does not occur. In the series-parallel resonant converter, the power supply gain, i.e. the ratio of the output voltage $V_o$ to the input voltage $V_{in}$, is a function of both operating frequency F and power supply load $R_L$. The resonant frequency $F_r$ is also a function of instantaneous load, so that the resonant frequency cannot be known without a priori knowledge of the instantaneous load resistance. Thus, a fixed lower operating frequency limit cannot be set, to insure that above-resonance operation is always attained, while still allowing the converter operating frequency to be near its resonant frequency, which operation is necessary to obtain full output, and therefore high efficiency, from the converter. Low switching loss, in the various power semiconductor devices of the converter, is achieved only if above-resonance operation is maintained. More importantly, the polarity of the converter gain changes if the operating frequency suddenly changes from above resonance to below resonance, as might occur for a sudden load resistance change (typically, to a lower load current) when the converter operating frequency is only slightly above the resonance frequency. Since proper operation of the power supply, of which the resonant converter is a major part, typically requires operation with sudden and rapid load condition changes, it is imperative that the converter be provided with a control circuit which not only can determine whether the converter operating frequency is above or below the resonant frequency, but which also will maintain the operating frequency above the resonance frequency ($F > F_r$) even with substantially instantaneous transient load or input voltage changes, to prevent converter instability. Thus, a control circuit for automatically and instantaneously maintaining a resonant converter in operation at a frequency above the resonance frequency of that converter, independent of the frequency at which the resonance occurs, is highly desirable.

BRIEF SUMMARY OF THE INVENTION

In accordance with the invention, a control circuit for insuring super-resonant operation of a DC-to-AC resonant converter, having a resonance circuit with a resonant frequency $F_r$, in which a circulating current $i_r$ flows between a first node, alternatingly connected between an input potential and a primary common potential at an operating frequency F, and a second node, includes: means for generating a first signal representative of the phase of the circulating current $i_r$; means for generating a second signal representative of the phase of a potential $V_{AB}$ between the first and second nodes; and means for comparing the first and second signals to increase said operating frequency F if the phase of the circulating current $i_r$ leads the phase of the node-to-node potential $V_{AB}$. The resonance circuit can be a series, parallel or series-parallel arrangement, typically driven by a pair of alternating conductive semiconductor switching devices, themselves driven by a voltage-controlled oscillator (VCO). The VCO frequency is substantially the operating frequency of the converter, so that a controller, comparing the present VCO output waveform (representative of the $V_{AB}$ potential phase) with the zero crossings of the circulatory current waveform (representative of the $i_r$ phase), can assure super-resonant operation by causing an increase in the VCO frequency whenever a current zero crossing occurs before the end of a VCO waveform half-cycle.

In a presently preferred embodiment, the converter is of series-parallel resonant configuration. If operation is at a frequency F sufficiently high such that any driver delay, between each VCO transition and the associated circulating current zero crossing, is an appreciable portion of one cycle at the operating frequency, then a later portion of the VCO ramp waveform and an additional time interval (which may be of fixed duration) determines a window interval during which a current zero crossing can cause earlier-than-normal commencement of a next operating cycle, thus increasing the operating frequency F. This increase continues until F is again greater than $F_r$, when the current zero crossing signal again appears at a time after the window signal is disabled. If operation is at a frequency sufficiently low so that any driver delay is not a substantial problem, then a blanking interval occurs at the end of each VCO cycle to disable the advancement of VCO frequency by a current zero crossing occurring during the blanking interval.

Accordingly, it is an object of the present invention to provide a novel resonant converter control circuit which will maintain the instantaneous operating frequency of the converter above the converter resonance frequency.

This and other objects of the present invention will become apparent upon reading the following detailed description of the preferred embodiment, when considered in conjunction with the drawings.

DETAILED DESCRIPTION OF THE INVENTION

Figure 1:
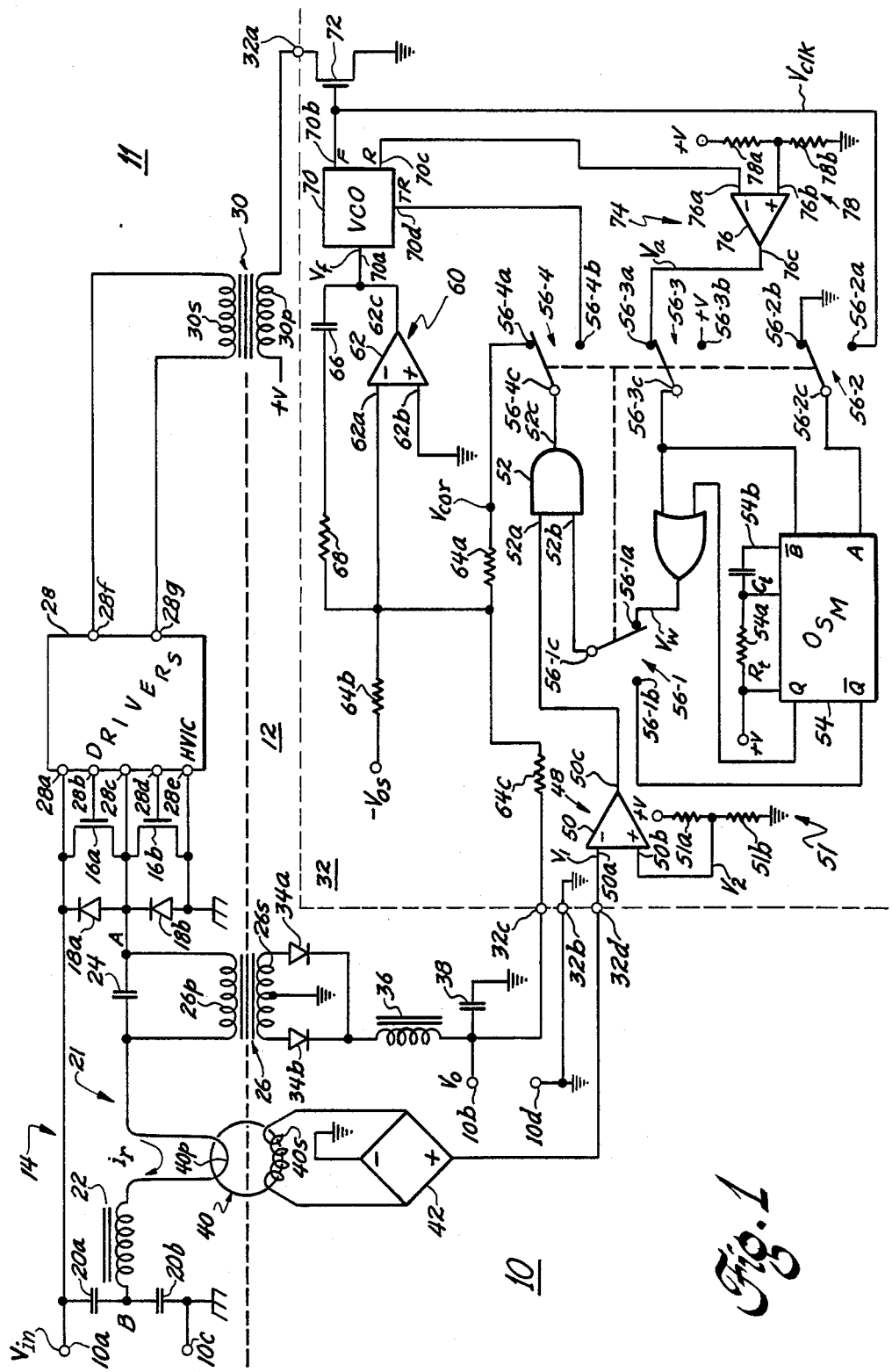
FIG. 1 is schematic block diagram of a series-parallel resonant DC-to-DC converter, and of a presently preferred control embodiment of my novel circuit for insuring operation thereof above the instantaneous resonant frequency.
Figure 1A:
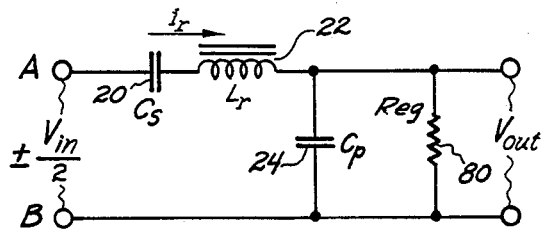
FIG. 1a is schematic diagram of the equivalent circuit of the series-parallel converter, and is useful in understanding operation thereof.
Figure 1B:
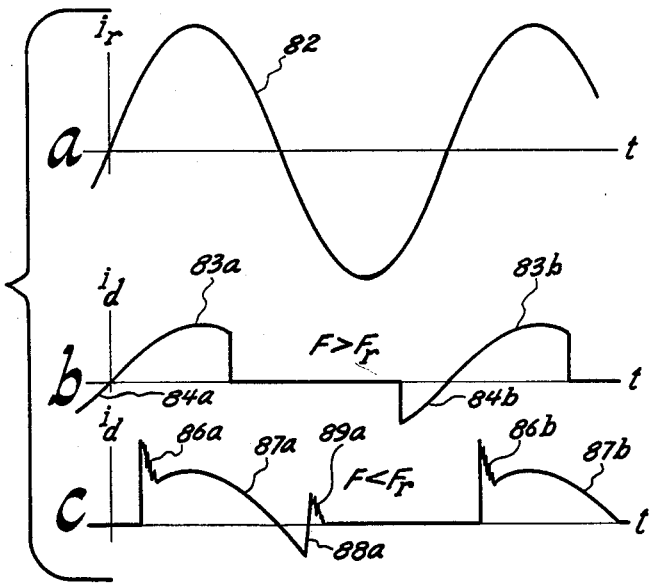
FIG. 1b is a set of three time-coordinated graphs of the resonant circulating current and the semiconductor power switching device current in the respective above-resonance and below-resonance conditions, and is also useful in appreciating the problem to which the present invention is directed.

Referring initially to FIG. 1, a power supply 10 receives an input DC voltage $V_{in}$ at an input terminal 10a and provides an output DC voltage $V_0$ at an output terminal 10b. The power supply 10 includes a primary side section 11, receiving the input voltage, electrically separated from a secondary side section 12, providing the output voltage. Only magnetic coupling between the primary and secondary sections is utilized. Primary side section 11 is comprised of a resonant DC-to-AC converter means 14, such as a half-bridge series-parallel converter. A first side, or leg, of the bridge is comprised of first and second switching power devices 16a and 16b, connected in series between input voltage terminal 10a and a primary side common potential terminal 10c. Preferably, device 16 are power MOSFETs. One of reverse-conduction means 18, such as semiconductor power diodes 18a and 18b, is connected in inverse parallel across the controlled-conduction circuit of each of switching devices 16. The common junction between devices 16a and 16b, and diodes 18a and 18b, is a circuit connection point A. A second circuit connection point B is formed at the junction between first and second series-connected capacitors 20a and 20b, forming the other half (leg) of the bridge circuit and connected between input voltage terminal 10a and common terminal 10c. Each of capacitors 20a and 20b is of a capacitance value $C_S/2$, such that, for AC purposes, a series capacitance $C_S$ appears between point B and primary side common potential.

A series-parallel resonant circuit 21 includes a "series" capacitance formed by the bridge capacitors 20a and 20b, and other elements connected between junctions A and B: an inductive element 22, having a resonance inductance $L_r$ (e.g. about 48 microhenries, for bridge capacitors 20a and 20b having a capacitance $C_S/2$ of 0.005 microfarads each, in an illustrative embodiment), is connected in series with a parallel resonance capacitor 24, having a capacitive value $C_P$ (about 0.01 microfarads in the illustrated embodiment), which is itself in parallel across the primary winding 26p of the converter power transformer 26. Resonant circuit circulating current $i_r$ flows through the circuit, inducing a potential across the power transformer secondary winding 26s, responsive to a substantially square switching waveform at point A, with respect to common potential point 10c, due to the mutually-exclusive alternating switching of devices 16. That is, the voltage at junction A alternates between substantially the input DC voltage $V_{in}$ and the primary side common potential. A substantially-square waveform signal is thus generated across the primary winding 26p.

Devices 16 are controlled by a driver circuit 28, preferably formed in a single high-voltage integrated circuit (HVIC). Such a driver circuit, as well as a isolation means 30 utilized for secondary side-to-primary side communication, is described in co-pending application Ser. No. 938,089, filed Dec. 4, 1986, assigned to the assignee of the present invention, and incorporated herein in its entirety by reference. Briefly, the HVIC 28: receives the primary side operating potential $V_{in}$ at a first terminal 28a; provides an upper bridge switching device drive signal at a first output 28b, with respect to a mid-bridge potential received at terminal 28c; and also provides a lower bridge switching drive control signal at another output terminal 28d, with respect to the primary side common potential at a terminal 28e. All of these signals occur with proper characteristics to commence operation of the resonant converter circuit and cause the power supply output voltage $V_0$ to increase from zero toward the desired value. As the desired value is approached, means 32 on the secondary side provides a feedback signal, via isolation transformer 30 between the input terminals 28f and 28g of the driver integrated circuit 28, for closed loop control of the resonant converter by controlling the switching times and frequencies of devices 16. Thus, the frequency of periodic pulses at an output 32a of secondary side control means 32 (preferably itself formed as a second integrated circuit) appears across the primary winding 30p of the isolation transformer and is magnetically coupled to the isolated secondary winding 30s to provide a control signal thereacross at the same frequency. This variable-frequency feedback signal is used to control the operating frequency at which the current flowing through main power transformer primary winding 26p is varied. Responsive thereto, the frequency of the potential across main power transformer secondary winding 26s varies. The secondary winding potential is full-wave rectified by a pair of semiconductor rectifying devices 34a and 34b, and the full-wave power signal is filtered by a series inductance 36 and shunt capacitance 38, to provide the power supply output voltage $V_0$ at output terminal 10b, with respect to a secondary side common potential at terminal 10d, and control IC terminal 32b. The output voltage is also connected to the control integrated circuit first input terminal 32c.

In accordance with one aspect of the invention, the converter operating frequency is to be increased if the phase of the converter circulating current $i_r$ leads the phase of the converter voltage $V_{AB}$. If this voltage cannot be conveniently directly measured, then an analog thereof (such as the phase of the reversal of switching device conduction) must be instead measured. An analog of the circulating current $i_r$, which analog is here the full-wave-rectified signal $V_1$, is provided at a second control IC input $32d$ to obtain information as to the relative phase of the resonant circuit circulating current $i_r$ with respect to the operating frequency signal responsible for reversing the voltage $V_{AB}$ by the switching of bridge devices 16. Here, the resonance current $i_r$ is caused to flow in a single-turn primary winding $40p$ of a current transformer means 40, having a secondary winding $40s$ connected to the AC inputs of a bridge rectifier means 42. The positive signal output of bridge rectifier means 42 is connected to $V_1$ input terminal $32d$ of the secondary side control integrated circuit 32.

In accordance with the invention, presently preferred embodiments of super-resonant frequency control means 32 includes a first comparative means 48, for instantaneously comparing the full-wave-rectified signal $V_1$ against a substantially constant reference signal $V_2$ to provide a pulse in a zero crossing signal $V_3$ whenever the instantaneous magnitude of signal $V_1$ falls below the magnitude of reference signal $V_2$. Comparator means 48 includes a comparator circuit portion 50, having a first, inverting input $50a$ receiving the first signal $V_1$ from input terminal $32d$. Comparator 50 has a second, non-inverting input $50b$ receiving the reference voltage $V_2$ from a reference signal providing means 51. Means 51 can comprise a voltage divider, as of series-connected resistors $51a$ and $51b$, connected between a stable potential $+V$ and common potential. The comparator output $50c$ provides zero crossing signal $V_3$ to the first input $52a$ of a multiple-input AND gate 52. A second gate input $52b$ is provided either directly from a "false" $\bar{Q}$ output of a one-shot-multivibrator (OSM) means 54 (in a "low" operating frequency embodiment), or (in a "high" frequency embodiment, where there is a need to compensate for driver delay, from the transition of the VCO means F output signal to the actual transition of FET drive) the second gate input $52b$ signal is provided from the output $53c$ of a two-input OR gate 53, having the "true" Q output of OSM 54 connected to a first input $53a$ thereof. Gate input $52b$ is typically permanently connected to only one of gate output $53c$ or the OSM $\bar{Q}$ output; a "phantom" first switching means portion 56-1 is shown to facilitate discussion of both situations. Thus, gate output $53c$ is connected to phantom switch contact 56-1a, while the $\bar{Q}$ output of OSM means 54 is connected to contact 56-1b. Common contact 56-1c can be set to route the signal from a selected one of contact 56-1a or contact 56-1b via contact 56-1c to the AND gate input $52b$.

The normally-high or normally-low logic level at the respective $\bar{Q}$ or Q output of means 54 is temporarily pulsed to a respective low or high logic level for a time interval T, of duration dependent upon the resistance $R_t$ of a timing resistance $54a$ and the capacitance value $C_t$ of a timing capacitance $54b$ associated with the multi-vibrator, responsive to the signal at the respective A or $\bar{B}$ input of the multivibrator transitioning in a respective positive-going or negative-going direction. The multivibrator trigger input A receives its signal from the common terminal 56-2c of a second phantom switching means 56-2; the $\bar{B}$ multivibrator trigger input, as well as the other OR gate input $53b$, receives the signal at the common terminal 56-3c of a third phantom switching means 56-3. The AND gate output $52c$ is connected to a common terminal 56-4c of a fourth phantom switching means 56-4. It is contemplated that, in each of the four illustrated sections 56-1, 56-2, 56-3 and 56-4, permanent connection of the common terminals 56-1c, 56-2c, 563c, and 56-4c, to only of the selectable terminals 56-1a or 56-1b, 56-2a or 56-2b, 56-3a or 56-3b, 56-4a or 56-4b will be permanently made (as by jumpers and the like) in a particular control circuit embodiment; the use of switching means 56 is illustrated only to allow switching between two distinct embodiments, for power supplies operating at sufficiently high frequency that an appreciable delay occurs through the primary side of the driver integrated circuit 28 (switching means 56 connecting common terminals C to first selectable terminals a) or for power supplies operating at much lower frequencies, where the delay through integrated circuit 28 is substantially negligible (with permanent connection being made from common terminals c to second selectable terminals b). The AND gate output $52c$ is connected (through fourth switching section common terminal 56-4c to contact 56-4a) to a correction voltage $V_{cor}$ input of a controller means 60. Controller means 60 includes an operational amplifier 62 having a first-inverting input $62a$ connected: through a first input resistance $64a$ to receive the correction signal $V_{cor}$ from the output of gate 52; through a second input resistance $64b$ to a source of output voltage setting potential $-V_{os}$; and to the output voltage terminal $32c$ via a third input resistance $64c$. A second, non-inverting input $62b$ is connected substantially to ground potential. Operational amplifier output $62c$ is connected via an integration capacitance 66, and a feedback resistance 68, to inverting input $62a$. The controller output signal, at output $62c$, provides a frequency control signal $V_f$ to a first control input $70a$ of a voltage-controlled oscillator (VCO) means 70. The frequency of (1) a train of signal pulses at a first F output $70b$, and of (2) a train of sawtooth ramp signals at a second R output $70c$ of the VCO, is controlled by either, or both, of input voltage $V_f$ or an external trigger TR signal at a second input $70d$. The controlled-frequency pulses at VCO output $70b$ are applied to the gate electrode of an output switching transistor 72, which is connected between circuit common potential and terminal $32a$, for providing the periodic signal to isolation feedback means 30. This periodic, or clock, signal $V_{clk}$ is also connected to switch-/jumper terminal 56-2a, to provide, in the lower-frequency power supply control embodiment, the signal to the A triggering input of the multi-vibrator 54; in the higher-operation-frequency converter form of power supply, a disabling potential is applied to the A input.

In the higher-operating-frequency power supply embodiment (operating with resonant frequencies above about 100 Khz., having a finite delay through integrated circuit driver means 28, and having first terminals a connected to common terminals c of the switching means), the ramp R signal $V_r$ at second VCO means output $70c$ is coupled to a second comparator means 74. The first, inverting input $76a$, of a second comparative circuit 76, receives the $V_r$ signal. Another input $76b$ receives a ramp reference voltage $V_{rr}$, from the output of a second reference voltage providing means 78 (comprising resistances $78a$ and $78b$ series connected between potential $+V$ and ground potential). The ramp reference signal determines the reference potential (equal to some factor, less than unity, of the ramp maximum signal amplitude $A_m$) at which the second comparator output $76c$ switches between first and second logic levels. In the higher-operating-frequency converter form of power supply, in which second comparator means 74 is used, the comparator output provides, via phantom switch means 56-3, the trigger B input signal to the multivibrator means 54 and also provides the signal at the OR gate input 53b. In the lower-operating-frequency converter form of the power supply, input $\overline{B}$ receives a disabling +V potential.

Figure 1C:
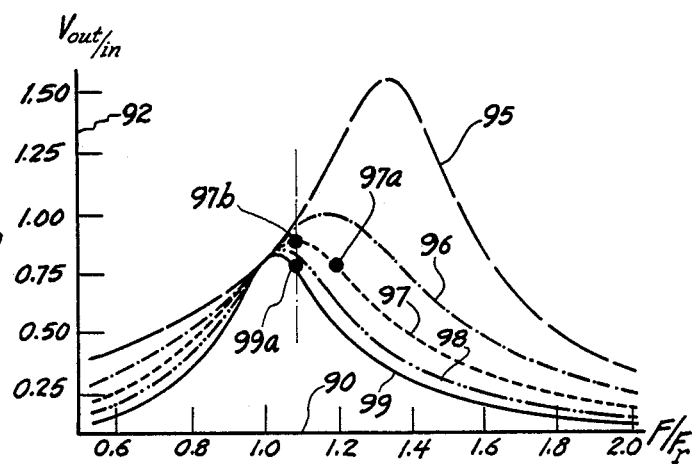
FIG. 1c is a graph of the converter gain and frequency relationships, and also useful in appreciating the problem overcome by the present invention.

Referring now to FIGS. 1 and 1a through 1c, the series-parallel resonant converter output voltage $V_{out}$, which is substantially the voltage across the main power transformer primary winding 26p, is determined by the equivalent resistance $R_{eq}$ of the reflected load resistance 80 appearing across parallel capacitance 24. The circulating current $i_r$ signal 82 (waveform a of FIG. 1b) is substantially sinusoidal, although the current $i_d$ in each switching device flows for less than an entire cycle and has a waveform dependent upon whether the operating frequency F is above or below the resonance frequency $F_r$ of the series-parallel circuit. As shown in waveform (b) of FIG. 1b, for the super-resonant condition ($F>F_r$), each of the switching devices commences conduction with a substantially zero magnitude of current flow $i_d$ therethrough, as at the beginning of each of transistor conduction portions 83a, 83b, . . . . Each of the devices is turned off and ceases to conduct at some point less than one-half of an operating frequency cycle later; the reverse-conduction diode 18 shunting that one of the controllable devices 16 conducts during an opposite-polarity portion 84a, 84b, . . . immediately preceding the device conduction portion 83a, 83b, . . . such that the diode and device conduction portions average to about 180° of conduction in each operating cycle. The other device 16 and diode 18 conduct in the other non-zero-current $i_d$ portion of each cycle. In the sub-resonant conduction (waveform C of FIG. 1b), with the operating frequency $F<F_r$, the turn-on moment does not occur at a zero current crossing and a current spike 86a, 86b, . . . occurs when the associated device is turned on. After the turn-on current spike 86, the device current flow assumes a more sinusoidal shape in the remaining portion 87a, 87b, . . . and does smoothly terminate at a zero crossing, before the reverse-conduction diode (associated with that same device) begins conduction for a subsequent portion 88a, . . . . The diode conduction portion terminates with a current spike portion 89a of its own. Thus, it will be seen that super-resonant operation provides less stress upon the semiconductor components on the primary side circuit, and is desirable. As shown in FIG. 1c, wherein abscissa 90 is scaled in ratio of operating frequency F to resonant frequency $F_r$, and ordinate 92 is scaled in ratio of output voltage to input voltage, curves 95–99 respectively represent respective quality factor Q (i.e. $Q=2\pi F_r L_r/R_{eq}$) values of 1, 2, 3, 4 and 5; these curves are for the condition where the series capacitance $C_S$ (which is twice the value of each of the pair of substantially equal-valued capacitors 20a or 20b) is essentially equal to the parallel capacitance $C_P$. It will be seen that the resonant peak frequency is indeed a function of load, so that the resonant peak frequency is unknown if the instant-to-instant connected load magnitude is also unknown. Therefore, a fixed lower limit on operating frequency cannot be set to insure that super-resonant operation is maintained, while still allowing the converter to operate near its resonant peak, especially for relatively high loads (and therefore relatively high Q values), which operation close to the resonant peak is necessary to obtain full output from the converter. For example, if the converter is normally operating at location 99a (along curve 99 with Q=5 and an output voltage of about 0.8 $V_{in}$), a sudden reduction in load should cause operation to shift, for example, to a new location 97a, with the same ratio of $V_{out}/V_{in}=0.8$. However, because the actual operating frequency F is determined by the rate at which the controlled power switching devices 16 are driven, this rate would normally be maintained constant for at least some time (i.e. the supply operation shifts essentially along a vertical line in the graph of FIG. 1c) so that a new operation location 97b is used; it will be seen that the latter location is in the sub-resonant region (i.e. is to the left of the resonant peak of curve 97), so that the controllable gain is inverted, and the supply ceases to operate properly.

Figure 2:
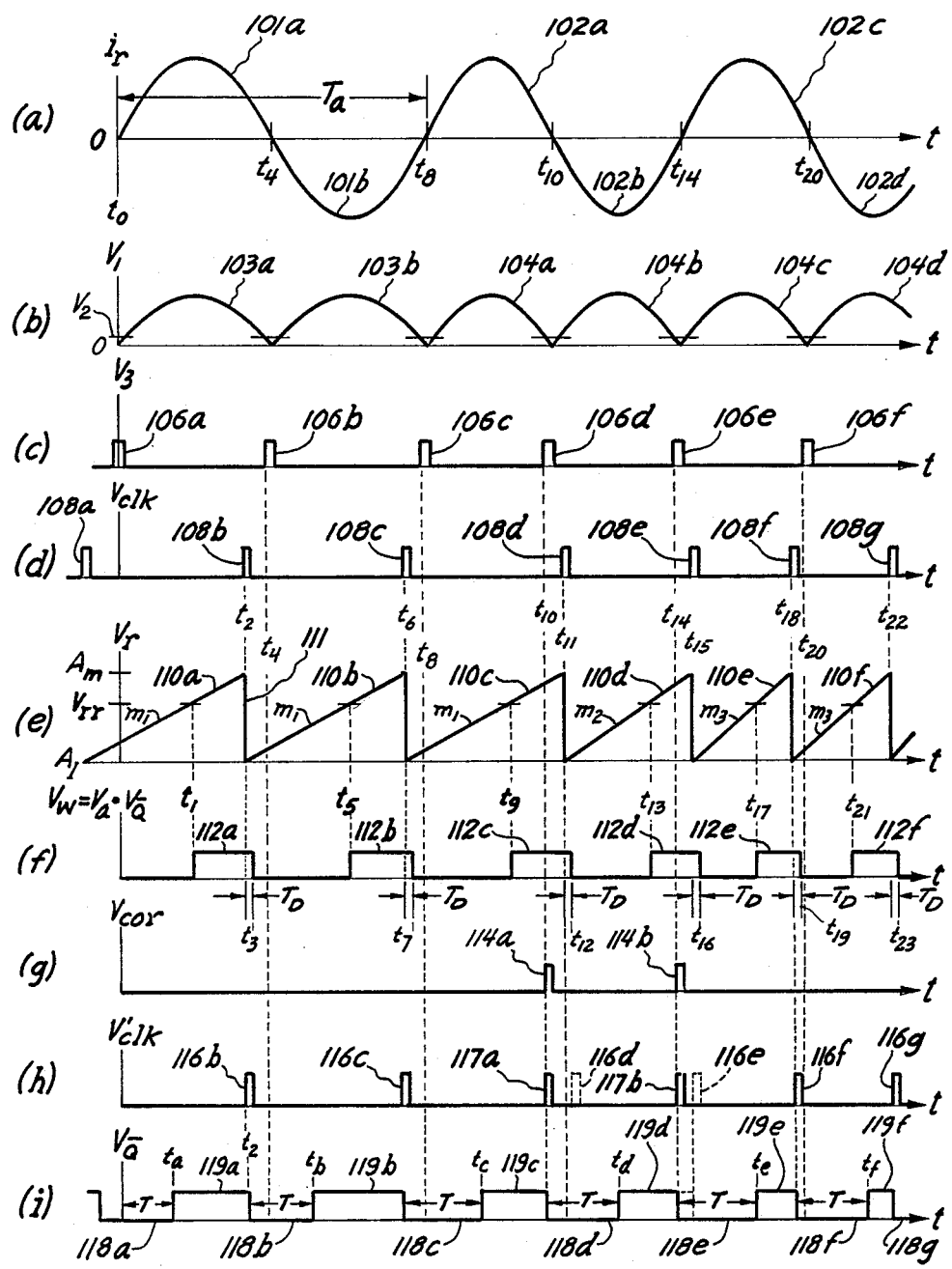
FIG. 2 is a set of nine time-related graphs of various signals appearing in one or the other of the presently preferred control circuit embodiments, and useful in understanding operation thereof.

Referring now to FIGS. 1 and 2, in a power supply 10 embodiment operating at a frequency sufficiently high so that an appreciable time delay occurs from the appearance of the switching pulse of the VCO means output 70b to the time at which the conduction states of controlled switching devices 16 are caused to reverse responsive to that output 70b pulse, waveforms (a)–(g) (of FIG. 2) occur in the embodiment of control circuit 32 wherein: second comparator output 76c provides both the multivibrator input $\overline{B}$ drive (the A input being disabled by connection to common potential) and the signal to the second input 53b of the OR gate; the AND gate second input 52b is connected to OR gate output 53c; the AND gate output 52c is connected to the correction voltage $V_{cor}$ input resistor 64a of the integrator controller means 60; and the power supply load suddenly decreases (i.e. $R_L$ suddenly increases) to suddenly increase the resonant frequency of circuit 14. It will be understood that a sudden increase of load, occurring for a sudden decrease in load resistance and appearing as a sudden decrease in circuit resonant frequency, will be of considerably less import to power converter operation, as a sudden decrease in resonant frequency actually decreases the possibility of the converter closed loop gain having a sign reversal; it is only during a sudden resonant frequency increase that comparison of the operating frequency to resonant frequency must be made. By way of illustration, the initial time interval $T_a$ for one cycle is about 4.8 microseconds, for an operating frequency slightly greater than 208 KHz., with a resonant frequency of about 190 KHz. Thus, both the positive-polarity half-cycle waveform portion 101a and the negative-polarity half-cycle waveform portion 101b each have a time duration (respectively between cycle start time $t_0$ and cycle midtime $t_4$, and between midtime $t_4$ and cycle end time $t_8$) of about 2.4 microseconds each. The duration of each half cycle portion 102 thereafter, due to the decreased load causing a higher frequency, is somewhat shorter (e.g. on the order of 2 microseconds per each half-cycle) with a desired operating frequency F of about 250 KHz., above the increased resonant frequency $F_r$ of about 230 KHz. The full-wave-rectified signal $V_1$, provided at control circuit input 32d, has a waveform (b) comprised of positive-polarity half cycle portions 103, e.g. half-cycle portions 103a and 103b, each obtaining substantially zero amplitude with the initial half-cycle timing of about 2.4 microseconds between each sequential pair of zeros; thereafter, the shorter duration half-cycle portions 104 (e.g. first through fourth illustrated portions 104a through 104d) have intervals of only 2.0 microseconds between the zero amplitude at times $t_8$, $t_{10}$, $t_{14}$, $t_{20}$, . . . . The first comparator output signal $V_3$ (waveform c) provides a positive-going pulse 106 for a short time interval about each zero crossing; thus, the illustrated six resonance circuit current zero crossing pulses 106a, 106b, 106c, 106d, 106e, 106f, . . . respectively occur at times $t_0$, $t_4$, $t_8$, $t_{10}$, $t_{14}$, $t_{20}$, . . . . The VCO clock pulse signal $V_{clk}$ (waveform d) provides an F output pulse 108 at the time when the VCO means ramp R waveform signal $V_r$ (waveform e) reaches a peak magnitude $A_m$ and abruptly falls to a commencement amplitude $A_1$ (illustratively, a substantially zero amplitude), before commencing the increasing-amplitude ramp waveform 110 for the next cycle. It will be seen that proper super-resonant operation occurs if the end of a VCO means cycle (indicated by one of pulses 108) occurs at some time after the commencement of each half cycle, and (because the $V_{AB}$ phase must lead the $i_r$ phase) also before the next resonant circuit current zero crossing, as indicated by one of pulses 106. Because it is desirable not to have a normal current zero crossing pulse (i.e. one occurring for super-resonant operation) generate a correction a "window" signal $V_W$ waveform 112 (waveform f) is generated to indicate that interval during which occurrence of a zero-crossing pulse should cause a reversal of that one of the pair of switching devices then conducting (i.e. when $V_w$ is low, a zero crossing pulse will not generate a correction signal). The window waveform is enabled at time $t_1$, when the VCO ramp waveform 110 increases to a level equal to the ramp reference signal $V_{rr}$ level (which, because pulses 106 will normally occur after the ramp commencement time, e.g. time $t_1$, and after initial portion of each ramp 110, is set to some level $V_{rr}=aA_m$, where $a<1$, and typically $0.6 \leq a \leq 0.9$); the window signal 112 remains enabled until a time $T_D$ (established as the longest time for a pulse at VCO means terminal 70b to propagate across the isolation device 30 and through the driver circuit 28 to cause bridge switching device conduction reversal) after the actual occurrence of a trailing edge 111. In this manner, it can be assured that the operating frequency is always greater than the resonant frequency. Therefore, each of window portions 112 is generated by the electrical OR'ing of the signal $V_a$ obtained from the second comparator means output 74c and the Q output signal from multivibrator means 54. Signal $V_a$ commences at that time $t_1$, $t_5$, $t_9$, $t_{13}$, $t_{17}$, $t_{21}$, . . . when each of the ramp portions 110a, 110b, 110c, 110d, 110e, 110f, . . . exceeds the ramp reference level $V_{rr}$ and continues until the ramp cessation at time $t_2$, $t_6$, $t_{10}-$, $t_{14}-$, $t_{18}$, $t_{22}$, . . . . The Q output signal starts when the multivibrator is triggered at each ramp falling edge 111 (enabling the negative-going $\overline{B}$ input of the multivibrator), and ends after an interval of duration $T_D$ (established by the $R_t$ and $C_t$ timing values) thereafter, at window cessation time $t_3$, $t_7$, $t_{12}$, $t_{16}$, $t_{19}$, $t_{23}$, . . . . The logical AND'ing of the window $V_W$ signal and the current zero crossing comparator signal $V_3$ provides frequency correction signal $V_{cor}$ or pulses 114 (waveform g of FIG. 2) whenever the pulses 106 occur during the time when $V_w$ is high, which is the condition for increasing the alteration frequency of the switching devices. Each of correction pulses 114 is integrated in controller 60, to increase the effective slope of each of the ramp portions and therefore increase the effective operating frequency, to maintain that operating frequency above the now-increased converter resonant circuit frequency. Thus, ramp portion 110d has a slope $m_2$ which is greater than the slope $m_1$ of ramp portions 110a-110c; ramp portions 110e and 110f have a slope $m_3$ which is even greater than slope $m_2$.

Specifically, when the increased load effectively increases the resonant frequency, after time $t_8$, the new circulating current zero crossing, at time $t_{10}$, causes zero crossing pulse 106d to be generated at a time $t_{10}-$ prior to the time $t_{12}$ at which $V_w$ returns low, so that a first correction pulse 114a is generated. Integration of pulse 114a reduces the frequency-controlling voltage $V_f$ at input 70a, resulting in the next VCO means ramp waveform 110d having a greater slope. This increased-slope ramp waveform will now end at time $t_{15}$, and generate a clock pulse 108e; however, the circulating current zero crossing pulse 106e still occurs prior to time $t_{16}$, so that another correction signal pulse 114b is generated. The second correction pulse is integrated and results in an even greater slope $m_3$ for the next ramp waveform 110e. This VCO means waveform reaches the maximum voltage $A_m$ at a time $t_{18}$ which is sufficiently prior to the time $t_{20-}$ at which the next zero crossing pulse 106f occurs, so that additional correction pulses are not generated; the new VCO frequency has been raised by a sufficient amount to be greater than the new resonant frequency, as indicated by each of the $V_3$ pulses 106f, . . . , occurring more than the additional delay interval $T_D$ after each of the associated one of the new VCO means output frequency clock waveform pulses 108f, . . . .

In a power supply embodiment operating at a frequency sufficiently low so that no appreciable time delay occurs from the appearance of the switching pulse of the VCO means output 70b to the time at which conduction states of the controlled switching devices 16 are caused to reverse, responsive to that output 70b pulse, waveforms (a)-(c), (h), and (i) of FIG. 2 occur in the embodiment of control circuit 32, wherein: second comparator means 74 is not utilized; the $V'_{clk}$ signal from VCO means output 70b is connected to the A (positive-triggering) input of multivibrator means 54 (with the negative-trigger $\overline{B}$ input of the multivibrator means receiving a disabling $+V$ potential); the AND gate second input 52b receives the $\overline{Q}$ output of the multivibrator means; and the gate output 52c is connected to the external trigger TR input 70d of the VCO means. Again, the power supply load suddenly decreases to suddenly increase the resonant frequency of circuit 14 (with any sudden load increase, resulting in a sudden circuit resonance frequency decrease, serving to further maintain super-resonant operating conditions, and not considered for analysis herein). It will be seen that the VCO means output pulses 116 still occur responsive to each falling edge at the end of a VCO means oscillation cycle. The multivibrator "false" $\overline{Q}$ output is at a low logic level, as in portions 118, for time interval T after being triggered; the normal, resting logic level of the $\overline{Q}$ output is a logic one level, as in portions 119. It is during the high logic level portions 119 that a resonant converter circuit current zero crossing, represented by one of pulses 106, can increase the switching device 16 reversal rate, if that zero crossing pulse 106 occurs prior to the end-of-cycle pulse 116. In the first full cycle shown (from time $t_0$ to time $t_8$) the load has not yet increased, and normal operation occurs, wherein each VCO means cycle is normally terminated with, and by, a pulse 116b, 116c, . . . . That is, the output pulse 116b, occurring at a time $t_2$, is prior to the zero crossing pulse 106b, so that an increase in switching device reversal frequency is not needed. Similarly, the pulse 116c (signifying the end of the second VCO means cycle) occurs at time $t_6$, sufficiently prior to the next resonant circulating current zero crossing pulse 106c, at time $t_8$, and causes the appearance of a low logic level portion 118c, such that the logic zero signal 118c is still present when the logic one pulse 106c occurs, and again results in a logic zero "pulse" applied to the external triggering TR input of the VCO means, such that additional cycle insertion does not occur. With the appearance of the new zero crossing pulse 106d at a now-shorter time interval after the last previous zero crossing pulse 106c, the zero crossing pulse appears at a time $t_{10}$, prior to the time $t_{11}$ at which the next VCO cycle-ending pulse 116d (shown in phantom) would occur, and thus occurs while the multivibrator means output is at a logic one level, in portion 119c. The two logic one levels combine to provide a logic one level external triggering pulse 117a at VCO means input 70d, terminating the present VCO means cycle prematurely and causing the next cycle to commence at the time $t_{10}$, instead of at original later time $t_{11}$. After the initial portion of the next cycle occurs and the multivibrator output signal returns to a logic one level, in portion 119d, the next circulating current zero pulse 106e occurs at a time $t_{14}$ which is still ahead of the time $t_{15}$ at which the new, slightly-increased frequency would provide a clock pulse (phantom pulse 116e), so that an additional external-transition TR pulse 117b is sent and another VCO means frequency increase occurs. Thereafter, the circulating current zero crossing pulses 106f, . . . , occur after the occurrence of the end-of-cycle pulses 116f, 116g, . . . , with each of pulses 106 occurring during a logic zero portion 118f, 118g, of the multivibrator output, so that further external-triggering pulses are not provided, as the VCO means frequency has increased sufficiently, due to the voltage control feedback loop action, to maintain that operating frequency above the now-increased resonant frequency of the converter.

While several presently preferred embodiments of my novel control circuit for insuring super-resonant operation of a series-parallel resonant converter, have been described in detail herein, many variations and modifications will now become apparent to those skilled in the art. For example, in a lower-frequency control circuit, the blanking time interval T need not be a fixed time interval, but can be a function of a circuit parameter (such as a function of VCO frequency) and the like. It is my intent, therefore, to be limited only by the scope of the appended claims and not by the details and instrumentalities described herein.

What I claim is:

1. A control circuit for insuring super-resonant operation of a DC-to-AC resonant converter having a resonance circuit, with a resonant frequency $F_r$, in which a circulating current $i_r$ flows between a first node, alternatingly connected between an input potential and a primary common potential at an operating frequency F, and a second node, said control circuit comprising:

means for generating a first signal representative of the phase of the circulating current $i_r$;

means for generating a second signal representative of the phase of a potential $V_{AB}$ between the first and second nodes; and means for comparing the first and second signals to increase said operating frequency F if the phase of the circulating current $i_r$ leads the phase of the node-to-node potential $V_{AB}$.

2. The control circuit of claim 1, wherein said first signal generating means includes means for generating a pulse substantially at each zero crossing of the circulating current.

3. The control circuit of claim 2, wherein the converter includes switching means for causing said alternating connection of said first node responsive to each transition of a drive signal at said operating frequency; and said comparing means generates a correction signal to increase the frequency of said drive signal if the occurrence time of any zero crossing pulse is within a designated drive signal cycle portion prior to the effective endtime of an associated cycle of said drive signal.

4. The control circuit of claim 3, wherein said converter includes means for providing the drive signal to the switching means with each drive transition occurring within a finite delay time interval after a corresponding change in an input signal; and further including: VCO means for generating a periodic VCO output signal with a frequency responsive to a control voltage $V_f$, said VCO output signal being coupled to said converter as said drive signal generating means input signal; and controller means for providing the control voltage $V_f$ at least in part responsive to said correction signal.

5. The control circuit of claim 4, wherein said comparing means includes first logic means, having a first input enabled by the zero crossing pulse and a second input enabled by a window signal defining the designated cycle portion, for providing said correction signal only if both of said first AND second inputs are simultaneously enabled.

6. The control circuit of claim 5, further comprising means for generating said window signal commencing after a predetermined portion of the time interval of each VCO output signal cycle has elapsed, and terminating a preselected time interval $T_D$ after the termination of each VCO output signal cycle.

7. The control circuit of claim 6, wherein said VCO means generates a ramp signal beginning at a first amplitude $A_1$ at each VCO output signal pulse and ending at a maximum amplitude $A_m$ at the next VCO output pulse; and said window signal generating means includes: means for generating a reference level $V_{rr}$ potential substantially equal to $a(A_m - A_1) + A_1$, where $0 \leq a \leq 1$; comparator means for generating a signal $V_a$ whenever the amplitude of said ramp signal is at least equal to the $V_{rr}$ reference level; monostable multivibrator means for generating a Q output signal for the preselected time interval $T_D$ commencing at the cessation of the $V_a$ signal from the comparator means; and logical means, having a first input enabled by the $V_a$ signal and a second input enabled by the Q signal, for providing the window signal at an output whenever either one of the first input OR second input is enabled.

8. The control circuit of claim 7, wherein the value of a is between about 0.6 and about 0.9.

9. The control circuit of claim 4, wherein the resonance circuit is a series-parallel resonant circuit.

10. The control circuit of claim 9, wherein the resonance frequency is on the order of 200 KHz.

11. The control circuit of claim 3, wherein said converter includes means for providing the drive signal to the switching means with each drive transition occurring within less than about 0.1 cycle delay after a corresponding change in an input signal; and further including: VCO means for generating a periodic VCO output signal, with a present VCO output signal cycle being terminated upon receipt of a trigger signal; said VCO output signal being coupled to said converter as said drive signal generating means input signal.

12. The control circuit of claim 11, wherein said comparing means includes first logic means, having a first input enabled by the zero crossing pulse and a second input enabled by a blanking signal defining the designated later portion of the VCO cycle, for providing said trigger signal only if both of said first AND second inputs are simultaneously enabled.

13. The control circuit of claim 12, further comprising means for generating said blanking signal as a pulse of selected duration responsive to each occurrence of the VCO means output signal pulse.

14. The control circuit of claim 13, wherein said blanking signal generating means comprises monostable multivibrator means for generating an output signal for the preselected time interval commencing at the occurrence of each VCO means output signal falling edge.

15. The control circuit of claim 14, wherein the resonance circuit is a series-parallel resonant circuit.

16. A DC-to-DC power supply, comprising:
a power converter having first and second nodes between which a periodic signal is provided at an amplitude related to the amplitude of an input DC potential and at an operating frequency responsive to the variable frequency of a drive signal;
a resonant circuit coupled between the first and second nodes of the power converter, and having a current circulating therethrough at said operating frequency;
means, receiving at least a portion of the resonant circuit circulating current, for providing a power supply DC output potential of amplitude responsive to the ratio of said operating frequency to the resonance frequency of said resonant circuit; and
means, monitoring the output potential and parameters representing at least the instantaneous operating and resonance frequencies, for controlling the drive signal frequency to maintain the DC output potential at a predetermined amplitude and simultaneously cause the operating frequency to always be greater than the resonance frequency.

17. The power supply of claim 16, wherein said controlling means includes: means for generating a first signal representative of the phase of the circulating current; means for generating a second signal representative of the phase of a potential $V_{AB}$ between the first and second nodes; and means for comparing the first and second signals to increase the operating frequency if the phase of the circulating current leads the phase of the node-to-node potential.

18. The control circuit of claim 17, wherein said first signal generating means includes means for generating a pulse substantially at each zero crossing of the circulating current.

19. The power supply of claim 18, wherein the converter includes switching means for causing an alternating connection between said input DC potential and common potential of said first node responsive to each transition of a drive signal at said operating frequency; and said comparing means generates a correction signal to increase the frequency of said drive signal if the occurrence time of any zero crossing pulse is within a designated drive signal cycle portion prior to the effective endtime of an associated cycle of said drive signal.

20. The power supply of claim 19, wherein said converter includes means for providing the drive signal to the switching means with each drive transition occurring within a finite delay time interval after a corresponding change in an input signal; and further including: VCO means for generating a periodic VCO output signal with a frequency responsive to a control voltage $V_f$, said VCO output signal being coupled to said converter as said drive signal generating means input signal; and controller means for providing the control voltage $V_f$ at least in part responsive to said correction signal.

21. The control circuit of claim 20, wherein said comparing means includes first logic means, having a first input enabled by the zero crossing pulse and a second input enabled by a window signal defining the designated cycle portion, for providing said correction signal only if both of said first AND second inputs are simultaneously enabled.

22. The control circuit of claim 21, further comprising means for generating said window signal commencing after a predetermined portion of the time interval of each VCO output signal cycle has elapsed, and terminating a preselected time interval $T_D$ after the termination of each VCO output signal cycle.

23. The control circuit of claim 22 wherein said VCO means generates a ramp signal beginning at a first amplitude $A_1$ at each VCO output signal pulse and ending at a maximum amplitude $A_m$ at the next VCO output pulse; and said window signal generating means includes: means for generating a reference level $V_{rr}$ potential substantially equal to $a(A_m - A_1) + A_1$, where $0 \leq a \leq 1$; comparator means for generating a signal $V_a$ whenever the amplitude of said ramp signal is at least equal to the $V_{rr}$ reference level; monostable multivibrator means for generating a Q output signal for the preselected time interval $T_D$ commencing at the cessation of the $V_a$ signal from the comparator means; and logical means, having a first input enabled by the $V_a$ signal and a second input enabled by the Q signal, for providing the window signal at an output whenever either one of the first input OR second input is enabled.

* * * * *